March 3, 1959  E. J. SCHALL  2,875,509
METHOD OF FORMING ANCHORING CLUTCH
FOR TWO-SPEED COASTER BRAKE
Filed Nov. 30, 1954

WITNESS:
Esther M. Stockton

INVENTOR.
Elmer J. Schall
BY
Clinton L. James
ATTORNEY

United States Patent Office 2,875,509
Patented Mar. 3, 1959

2,875,509

METHOD OF FORMING ANCHORING CLUTCH FOR TWO-SPEED COASTER BRAKE

Elmer J. Schall, Horseheads, N. Y., assignor to Bendix Aviation Corporation, a corporation of Delaware Application November 30, 1954, Serial No. 471,967

2 Claims. (Cl. 29—159.2)

The present invention relates to a method of making an internally toothed clutch and anchor member for two-speed brakes, and more particularly to the type of clutch member illustrated in the patent to Hood 2,609,712 issued September 9, 1952, and assigned to the assignee of the present application; and there denominated with numeral 4 as shown in Fig. 1 of the drawing.

In the Hood patent there is illustrated a planetary reduction gear drive comprising an orbit gear 9, planet pinions 11, a slidable sun gear 21, and a bearing member 4 having internal teeth 22 adapted to receive the sun gear and hold it from rotation when the device is operating in low gear. This bearing member 4 thus serves as a clutch member to prevent rotation of the sun gear, and as an anchor member to transmit the reaction torque of the reduction gear to the frame of the bicycle.

Considerable difficulty has been encountered in providing a method of producing this clutch member in a rapid and economical manner.

The method first followed was to drill a circular series of axially extending holes in the side of the clutch member, and then cut a countersink in the side of the clutch member having a diameter approximating the diameter of the circle on which said holes were drilled. This was a comparatively slow and costly method, and the clutch teeth so formed had plain cylindrical contours which did not conform to the teeth of the sun gear.

This method has been superseded in commercial production by one involving the production of an internally toothed clutch ring which is pressed and brazed in a counterbore of the clutch member. This permits forming the teeth with the desired contour, but is undesirably expensive, and entails additional operations.

It is an object of the present invention to provide a novel method of making an internally toothed clutch member which is rapid and economical and provides a superior product.

It is another object to provide such a method in which the product is a single integral unit.

It is another object to provide such a method which enables the clutch teeth to be rapidly and economically formed with any desired contour.

Further objects and advantages will be apparent from the following description taken in connection with the accompanying drawing in which.

Figure 1:
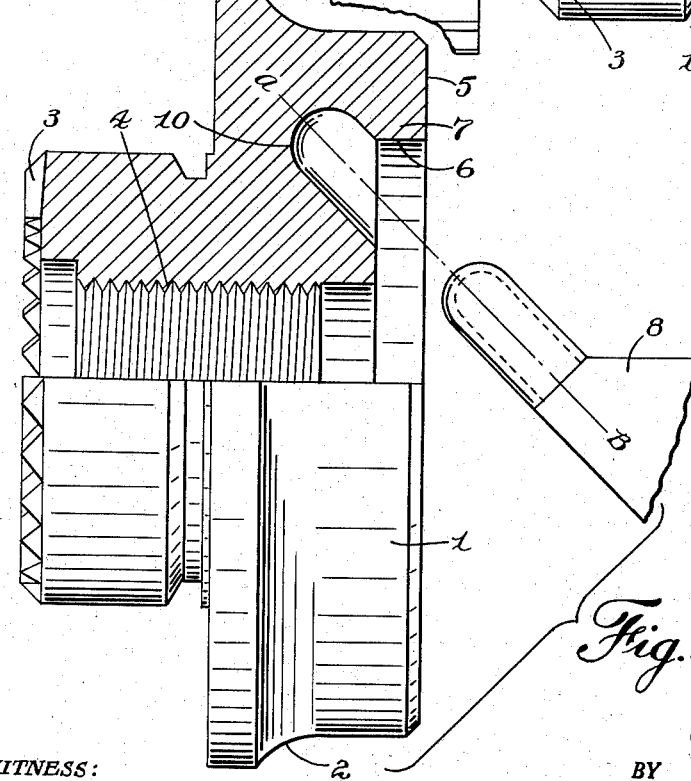
Fig. 1 is a side elevation, partly in section, of a partially completed blank, together with the undercutting tool used to bring the part to the indicated stage of manufacture.

In Fig. 1 of the drawing there is illustrated the blank for a bearing and clutch member 1 which is generally similar to the part 4 in the patent to Hood above cited. This member is provided with a bearing cone surface 2, a series of dentals 3 for cooperation with an anchoring member, and is internally threaded at 4 for a supporting sleeve. In carrying out the method of forming internal clutch teeth corresponding to the teeth 22 of the Hood patent, the blank is faced off to form a plain surface 5, and then counterbored as indicated at 6 to provide a rim 7. While the blank is being rotated, an undercutting tool 8 is advanced into the side of the blank at an acute angle to the axis of the work as indicated by the line A—B until a groove 10 is formed therein substantially deeper than the depth of the clutch teeth to be formed in the rim 7.

Figure 4:
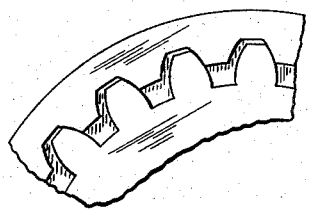
Fig. 4 is a detail showing the cooperation of the teeth of the sun gear with the teeth of the clutch member when the device is in use.
Figure 2:
Fig. 2 is a side elevation, partly in section, of the punch or shaving tool used to form the clutch teeth in the blank.
Figure 3:
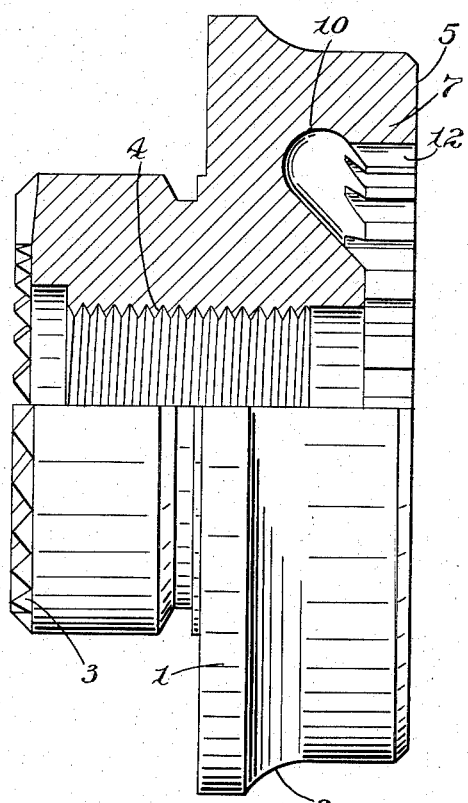
Fig. 3 is a side elevation partly in section of the completed part.

The blank is then transferred to a suitable punch press provided with a punch 9 (Fig. 2) having peripheral teeth 11 of suitable contour. The punch is then advanced into the counterbore 6 of the work, whereby the teeth 11 punch or shave corresponding teeth 12 (Fig. 3) in the rim 7 of the blank. During this operation, the undercut channel or groove 10 provides space for run-out of the tool as well as clearance for the chips formed by the punching operation.

Although the precise sequence of steps in the method above described is the presently preferred procedure, it will be understood that minor variations are possible without departing from the spirit of the invention as set forth in the appended claims.

I claim:

1. In a method of making a clutch member with an internally toothed rim, the sequence of steps of facing off the side of a blank, forming a cylindrical counterbore in the face of the blank having a flat bottom surface and leaving a rim with a cylindrical interior surface, rotating the blank about the axis of the counterbore while advancing a milling cutter into the bottom and side wall of the counterbore at an acute angle to the axis of the counterbore to undercut said rim to provide the shape of the inner side of the toothed rim while leaving the remainder of the bottom of the counterbore as an annular shoulder, and then shearing spur teeth in the inner surface of the rim by means of a formed punch.

2. A method as set forth in claim 1 in which the undercut channel is so formed that its horizontal width is substantially greater than the width of the clutch teeth, to leave room for tool run-out and chip clearance in the subsequent operation of forming the teeth.

References Cited in the file of this patent

UNITED STATES PATENTS

| | | |
|---|---|---|
| 1,486,365 | Cummings | Mar. 11, 1924 |
| 1,706,791 | Leighton | Mar. 26, 1929 |
| 1,868,037 | Weatherhead | July 19, 1932 |
| 2,079,513 | Lapsley | May 4, 1937 |
| 2,277,084 | Drissner | Mar. 24, 1942 |
| 2,636,254 | Gunning | Apr. 28, 1953 |